(12) United States Patent
Maurel et al.

(10) Patent No.: US 6,341,014 B1
(45) Date of Patent: Jan. 22, 2002

(54) METHOD OF AND A SYSTEM FOR DETECTING ERRORS IN HARMONIZING THE AXIS OF AN OPTICAL INSTRUMENT

(75) Inventors: Gilles Maurel, Le Cannet; Guy Henri Abel Cerutti-Maori, Cannes la Bocca, both of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/567,441

(22) Filed: May 10, 2000

(30) Foreign Application Priority Data

May 12, 1999 (FR) .............................. 99 06100

(51) Int. Cl.[7] .............................. G01B 11/26; G01C 1/00
(52) U.S. Cl. .................................................. 356/152.1
(58) Field of Search .............................. 356/152.1, 153, 356/400

(56) References Cited

U.S. PATENT DOCUMENTS 3,989,947 A 11/1976 Chapman 4,741,618 A 5/1988 Loy

FOREIGN PATENT DOCUMENTS

| EP | 0 189 001 A1 | 7/1986 |
| EP | 0 440 990 A1 | 8/1991 |
| EP | 0 918 240 A1 | 5/1999 |
| GB | 2 326 047 A | 12/1998 |

*Primary Examiner*—Thomas H. Tarcza
*Assistant Examiner*—Fred H Mull
(74) *Attorney, Agent, or Firm*—Sughrue, Mion, Zinn, Macpeak & Seas, PLLC

(57) ABSTRACT

The present invention relates to a method of and a system for detecting errors in harmonizing an optical instrument (1) with a reference direction (V—V). According to the invention, the reference direction (V—V) is materialized by a reference light beam (17) and the latter is directed onto an optoelectronic detector (3) disposed in the focal plane (2) via an invariant system (10) and an a focal system (6).

16 Claims, 2 Drawing Sheets

METHOD OF AND A SYSTEM FOR DETECTING ERRORS IN HARMONIZING THE AXIS OF AN OPTICAL INSTRUMENT

BACKGROUND OF THE INVENTION

The present invention relates to a method of and a system for detecting errors in harmonizing the optical axis of an optical instrument relative to a reference direction, in particular the required sighting direction. It also relates to an optical instrument including a detector system of the above kind.

Remote sensing satellites and recent space telescopes include many instruments which must be pointed simultaneously in the same reference direction, which is accurately determined by means of star sighting systems.

In an attempt to eliminate humanization errors between the optical axes of said instruments and the reference direction, which errors are essentially due to vibrations and temperature variations, the following three actions have been used individually or in combination:

moving said optical components closer together, fixing said optical instruments to a rigid structure which is thermally very stable, and applying thermal control to said structure.

Also, it is essential to check the harmonization obtained in this way, if possible periodically.

The measurements effected by such instruments are subject to errors caused by stray light, and bulky diaphragms or screens are disposed at the light entry of said instruments in an attempt to eliminate such errors.

SUMMARY OF THE INVENTION

The object of the present invention is to remedy the above drawbacks and improve the accuracy of sighting optical instruments relative to a reference direction (given by a star sighting system, for example), to improve the efficiency with which said instruments reject stray light, and to make the instrument insensitive to mechanical and thermal distortion.

To this end, the method of the invention for detecting errors in harmonizing the optical axis of an optical instrument with a reference direction is noteworthy in that:

said reference direction is materialized by a reference light beam; and said optical instrument incorporates:

an optoelectronic detector disposed in the focal plane of said optical instrument;

an a focal optical system coaxial with the optical axis of said optical instrument and which has a real entry pupil and forms a real image thereof; and an invariant optical axis translation system disposed in the vicinity of said real image of the entry pupil, said invariant system receiving said reference light beam and, regardless of the angle of incidence of said beam, generating an exit light beam which is parallel to said reference beam and which is directed towards said optoelectronic detector from at least approximately the center of said real image of the entry pupil, said optoelectronic detector delivering an electrical signal representative of the eccentricity of the light spot formed by said exit beam in said focal plane relative to the point at which the optical axis of said instrument passes through said optical plane.

Accordingly, the system of the present invention for detecting said harmonization errors includes:

means for generating a reference light beam materializing said reference direction; and incorporated in said optical instrument:

an optoelectronic detector disposed in the focal plane of said optical instrument;

an a focal optical system coaxial with the optical axis of said optical instrument and which has a real entry pupil and forms a real image thereof; and an invariant optical axis translation system disposed in the vicinity of said real image of the entry pupil, said invariant system receiving said reference light beam and, regardless of the angle of incidence of said beam, generating an exit light beam which is parallel to said reference beam and which is directed towards said optoelectronic detector from at least approximately the center of said real image of the entry pupil.

Thus, by virtue of the present invention:

real entry and exit pupils are created by means of said a focal optical system, which reduces stray light and consequently the volume of the optical instruments, which no longer require any baffles in the form of screens and/or diaphragms. It has been confirmed that, in the case of a star sighting system, the present invention reduces stray light by a factor of the order of 1000 compared to a prior art instrument with screens and/or diaphragms of equivalent bulk;

said output light beam can be injected at the center of said real image of the entry pupil, so that there is no resulting parallax error and it is therefore possible to inject a slightly defocused reference beam; and a light spot is formed on said optoelectronic detector in the focal plane of said optical instrument by said exit light beam so that the position of that light spot on said optoelectronic detector relative to the point at which the optical axis of said instrument passes through the latter detector is at all times representative of the instantaneous error in harmonizing the axis of said optical instrument relative to said reference direction.

Thus an electronic signal which is representative of said harmonization error is available at the output of said optoelectronic detector, which is of the CCD type, for example. The harmonization error signal can therefore be used for dynamic correction of pointing errors of said optical instrument. To this end, although it would be feasible to use said harmonization error signal to slave the position of the optical axis of said instrument to said reference direction, it is preferable to implement it, for example in software, to correct the image of the scene observed by said optical instrument by re-centering it in said exit light beam.

As is known in the art, the image of the scene observed by the optical instrument and formed by said optoelectronic detector takes the form of a succession of frames. Thus, in order to obtain a particularly distinct harmonization error signal at the output of said optoelectronic detector, a pulsed reference light beam is used and:

either a reference light beam pulse is directed onto said optoelectronic detector during some image frames, referred to as first image frames, and not during other image frames, referred to as second image frames, for example during one frame in two, and a second image frame is subtracted from a first image frame each time, so that the difference image comprises only the trace of said exit light beam, such subtraction eliminating the scene observed by the optical instrument and noise. This leaves only the error in harmonizing the axis of the optical apparatus and the reference direction;

or very short light pulses, for example pulses 1000 times shorter than the image frames, are directed onto said optoelectronic detector, said pulses being interleaved between the image frames. Thus observation of the scene observed by the optical instrument is not disturbed and the rejection of background noise from said scene is good.

The reference light beam can be of any kind and collimated or not. Note that, given chromatic aberrations of the optics of the instrument, the wavelength selected for the reference beam enables a slightly defocused image spot to be obtained, if necessary.

In a first embodiment of the invention, the cross-section of said exit beam is of the same order of magnitude as the area of the sensitive face of each of the individual photosensitive components constituting said optoelectronic detector and said optoelectronic detector has the structure of a matrix in which said photosensitive components are disposed in rows and columns. In this case in particular it is especially advantageous if said reference beam is a laser beam.

Alternatively, the cross-section of said exit beam is large compared to the area of the sensitive face of each of the individual photosensitive components constituting said optoelectronic detector, said exit beam forms the image of a test pattern in said focal plane and said optoelectronic detector includes at least one strip of such photosensitive components.

It is particularly advantageous if said test pattern has at least two rectilinear sections inclined relative to each other and relative to said strip.

Said a focal optical system can be implemented with lenses and/or concave mirrors, in a manner known in the art. It is advantageous for its magnification K to be greater than 1, for example equal to 3, because this reduces the constraints of implementing said invariant system by the factor K.

Said invariant optical axis translation system advantageously includes three reflective surfaces on the inside faces of a rectangular trihedron forming a hollow cube corner, two of said reflective surfaces are disposed to receive said reference light beam and the third of said reflective surfaces is intersected by the optical axis of said instrument and is disposed to direct said exit light beam onto said optoelectronic detector.

It is therefore possible to offset said optical instrument relative to said reference light beam with no loss of pointing accuracy.

To enable said optoelectronic detector to receive the scene observed by said instrument and said reference light beam equally well, said third reflector surface takes the form of a parallel-sided plate, through which the light rays from said scene pass. Note that said plate can be small in size and accommodated in a thermally protected location inside said instrument without increasing its overall size.

Said parallel-sided plate is preferably treated to increase its reflectivity for said reference light beam.

For reasons of overall size in the vicinity of said optical instrument, it can be advantageous for said means for generating said reference light beam to be remote from said optical instrument, for example at a distance of several meters. This spacing is made possible by the structure of the system according to the present invention.

The present invention also relates to an optical instrument whose optical axis must be harmonized with a reference direction, the instrument including a harmonization error detector system as described hereinabove.

Note also that, by virtue of the present invention:

it is possible to reduce dimensional constraints of mechanical and thermal origin when harmonizing a plurality of sighting axes;

the accuracy of pointing one or more optical axes can be improved, which is particularly advantageous in the case of star sighting systems;

the detector system is insensitive to defects of positioning of said invariant optical axis translation system;

the telescope of an interferometer array (aperture synthesis) can be aligned with the various channels of a power laser provided that said reference light beam is split into a plurality of reference beams; and inertial and gyroscopic systems and gyro-lasers can be recalibrated by star sighting, possibly by effecting a plurality of axis translations.

BRIEF DESCRIPTION OF THE DRAWINGS

The figures of the accompanying drawings show how the invention can be put into effect. In the figures, identical reference symbols designate similar components.

DETAILED DESCRIPTION OF THE INVENTION

Figure 1:
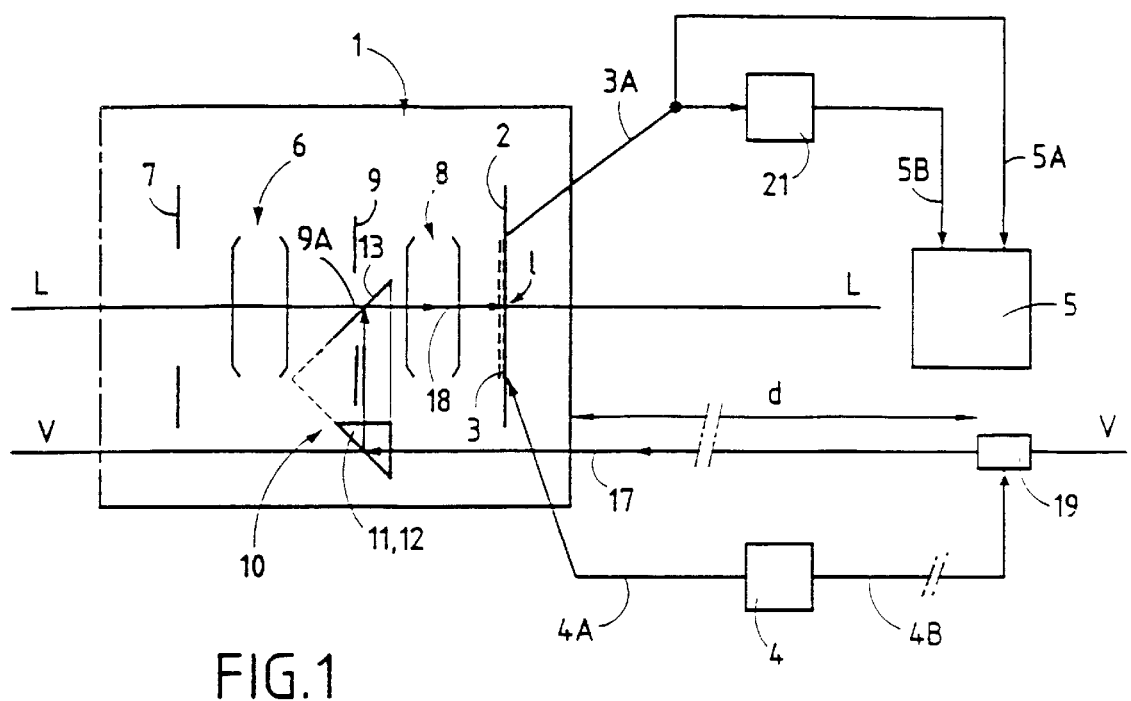
FIG. 1 is a diagram showing part of an optical instrument fitted with a harmonization error detector system according to the present invention.

The optical instrument 1, part of which is shown diagrammatically in FIG. 1, is a telescope, for example, and has an optical axis L—L and a focal plane 2. Its half-field is equal to α degrees, for example.

The optical instrument 1 includes:

an optoelectronic detector 3, for example of the CCD type, which is disposed in the focal plane 2 and controlled by the output 4A of the sequential control device 4. The output 3A of the detector 3 is connected to the input 5A of an image forming and processing system 5;

an a focal optical system 6 coaxial with the optical axis L—L of the instrument 1, to the front of the focal plane 2 and having a real entry pupil 7. The a focal optical system 6 can be implemented using lenses and/or concave mirrors and its magnification K is preferably greater than 1, for example equal to 3. It produces a real image 9 of the real entry pupil 7 having a center 9A and between the a focal optical system 6 and the objective 8;

an objective 8 centered on the optical axis L—L and disposed between the a focal optical system 6 and the optoelectronic detector 3. The objective 8 therefore has a half-field β equal to K.α.

The combination of the instrument 1, the detector 3, the a focal system 6 and the objective 8 must be very rigid and thermally stable. To this end a structure made of carbon/carbon material, the material known by the trade name ZERODUR or a like material is used.

Figure 2:
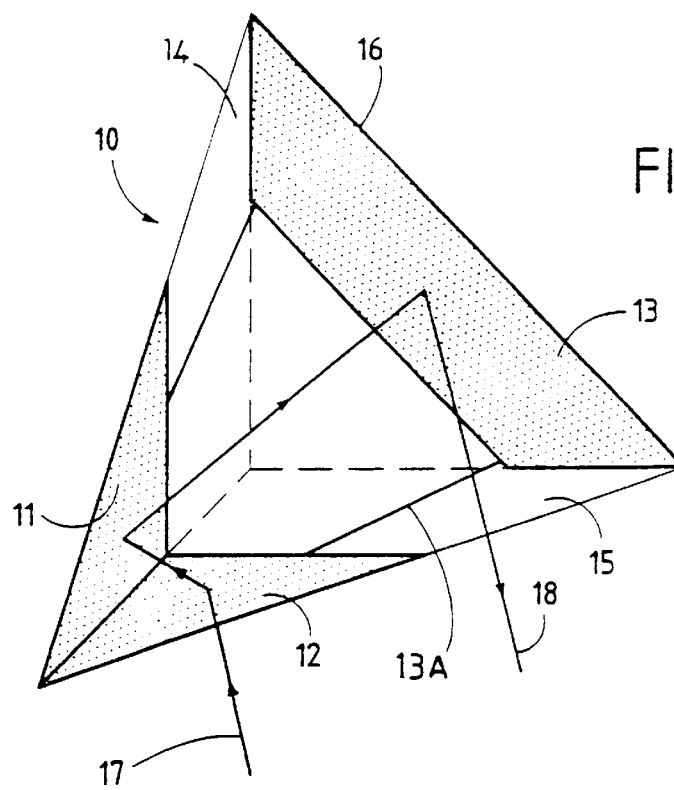
FIG. 2 is a diagrammatic perspective view of a invariant optical axis translation system forming part of said harmonization error detector device.

The optical instrument 1 further includes an invariant optical axis translation system 10, which is of the type shown in FIG. 2, for example. FIG. 2 shows that the system 10 includes three reflective surfaces 11, 12 and 13 on respective inside faces 14, 15 and 16 of a rectangular trihedron forming a hollow cube corner. The surfaces 11 and 12 are joined to the surface 13 by an intermediate surface 13A shown diagrammatically. As is known in the art, regardless of the angle of incidence of an entry beam on one of the reflective surface 11 or 12, say the reflective surface 12, the entry beam is reflected from the other reflective surface (here the surface 11) towards the reflective surface 13, which reflects it as an exit light beam 18 parallel to said incident beam 17.

The invariant optical axis translation system 10 includes a mount (not shown) made from a material which is mechanically and thermally very stable (ZERODUR, silica, etc.) so that said reflective surfaces 11, 12 and 13 together form a very rigid assembly. It is inserted into the optical instrument 1 at the location of the real image 9 of the real entry pupil 7 of the a focal optical system 6. The reflective surface 13, which is in the form of a parallel-sided plate, intersects the optical axis L—L of the instrument 1 at 45° and allows light rays to pass and form an image of the scene observed by the instrument 1 on the detectors 3.

The reflective surfaces 11 and 12 are spaced from the optical axis L—L and receive the light beam 17 from a source 19 at a distance d which is equal to several meters, for example. The light beam 17 is emitted on the axis V—V of said source 19 which is the required sighting direction for the axis L—L of the optical instrument 1.

Thus the invariant system 10 enables the exit beam 18 parallel to the entry beam 17 to be injected onto the detector 3 at least approximately from the center 9A of the pupil 9 and through the objective 8.

Figure 3:
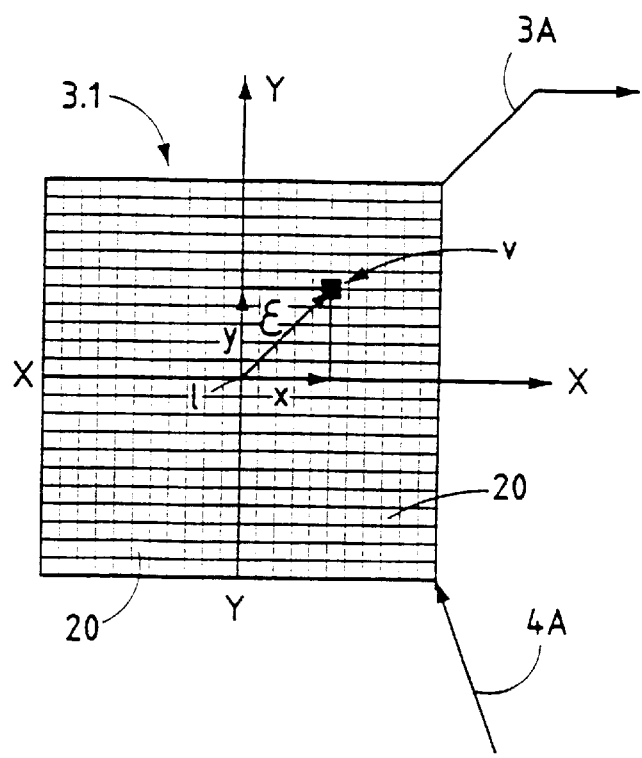
FIGS. 3 and 4 are diagrams showing two embodiments of an optoelectronic detector disposed in the focal plane of said optical instrument.

FIG. 3 shows an embodiment 3.1 of the optoelectronic detector 3 having a matrix structure in which the individual photosensitive components 20 are arranged in rows and columns. In this case, it is advantageous for the cross-section of the light beams 17 and 18, which are laser beams, for example, to be of the same order of magnitude as the area of the sensitive face of each of said photosensitive components 20, so that the spot v formed by the beam 18 on the detector 3.1 illuminates only a limited number of said photosensitive components 20, which number is preferably equal to 1 and in all cases not greater than 4.

Clearly:
if the optical axis L—L of the optical instrument 1 is perfectly parallel to the sighting axis V—V, the exit beam 18 is perfectly coincident with the optical axis L—L and the trace v of the beam 18 on the detector 3 is therefore coincident with the point 1 at which the optical axis L—L intersects the detector 3; and if the optical axis L—L of the optical instrument 1 is not perfectly parallel to the sighting axis V—V, the exit beam 18 is not coincident with the optical axis L—L and the trace v of the beam 18 on the detector 3 is therefore not coincident with the point 1 at which the optical axis L—L intersects the detector 3 (see FIG. 3).

Consequently, the position offset or error $\epsilon$ between the point 1 and the trace v is representative of the error in harmonizing the optical axis L—L relative to the sighting axis V—V. The position error $\epsilon$ detected by the detector 3, for example in the form of its x and y co-ordinates in a rectangular system of axes X,X–Y,Y passing through the point 1, is available at the output 3A of said detector 3 and is forwarded to an error reader system 21, for example.

Figure 4:
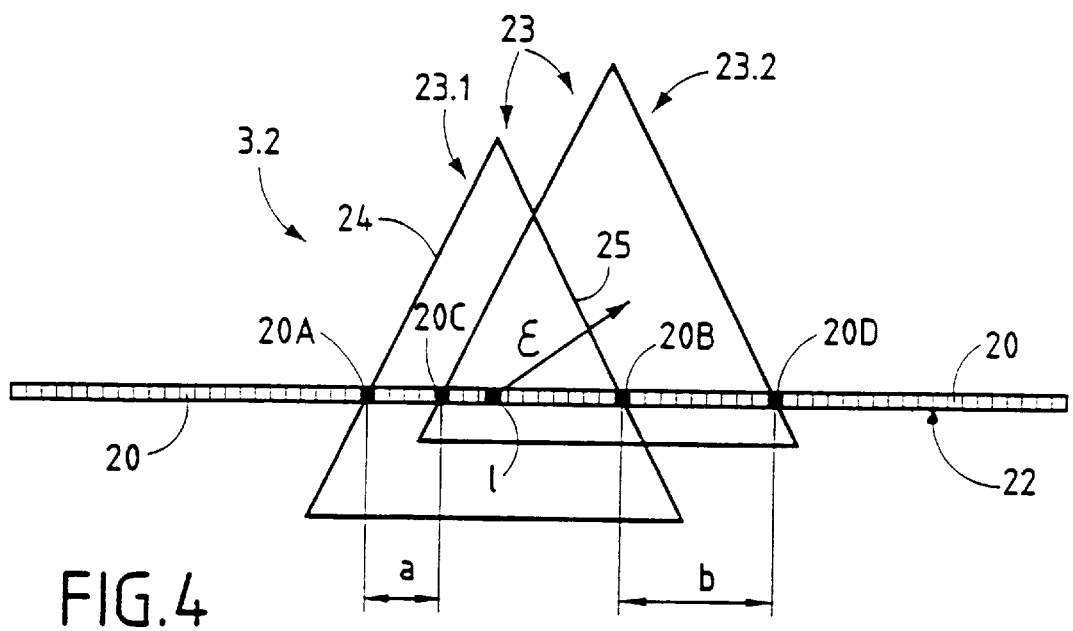

In the embodiment 3.2 shown in FIG. 4, the optoelectronic detector 3 includes a strip 22 of individual photosensitive components 20. In this case the cross-section of the beams 17 and 18 can be large compared to the area of the sensitive face of each of the photosensitive components 20 constituting said optoelectronic detector 3.2 and the output beam 18 can form the image of a test pattern 23 in the focal plane 2.

As shown in FIG. 4, the test pattern 23 includes at least two rectilinear sections 24 and 25 inclined relative to each other and relative to the strip 22.

Accordingly, in a manner similar to that described above:
if the optical axis L—L of the optical instrument 1 is perfectly parallel to the sighting axis V—V, the exit beam 18 is perfectly coincident with the optical axis L—L and the test pattern 23 (in this case at position 23.1) is therefore centered at the point 1 at which the optical axis L—L intersects the strip 22 and its rectilinear sections 24 and 25 respectively illuminate the photosensitive components 20A and 20B of the strip 22;

on the other hand, if the optical axis L—L is not perfectly parallel to the sighting axis V—V, the beam 18 is not coincident with the optical axis L—L and the test pattern 23 is therefore in an off-center position 23.2 corresponding to the harmonizing error $\epsilon$. In this off-center position 23.2 the rectilinear sections 24 and 25 respectively illuminate the photosensitive components 20C and 20D of the strip 22. Clearly the respective distances a and b between the components 20A and 20C, on the one hand, and the components 20B and 20D, on the other hand, enable the harmonization error $\epsilon$ to be determined.

In an embodiment of the invention that is not shown, the optoelectronic detector 3.2 includes, in addition to the strip 22 of individual photosensitive components 20, a second strip similar to and parallel to the strip 20. It is therefore possible to obtain from distances a and b from the two strips, in addition to the information already mentioned, roll information representative of rotation about the optical axis and affecting the harmonization error.

Accordingly, whichever embodiment 3.1 or 3.2 of the detector 3 is used, it can produce at its output 3A an electrical signal representative of the harmonization error $\epsilon$. The error signal is passed to the reader system 21 which forwards it to an input 5B of the system 5 in which the image of the scene observed by the instrument 1 and formed by said optoelectronic detector 3 can be corrected to eliminate said harmonization error.

The detector 3 therefore delivers at its output 3A, on the one hand, the electronic image of the scene observed by the instrument 1 and, on the other hand, the harmonization error electric signal $\epsilon$. Because the image of the scene observed by said optical instrument and formed by said optoelectronic detector 3 takes the form of a succession of frames, as is known in the art, it is advantageous to synchronize the operation of the source 19, which in this case is of the impulse type, with the sequential control system 4 of the detector 3, in order clearly to individualize said error signal $\epsilon$ relative to said electronic image. Such synchronization, which can be achieved by a connection 4B between the system 4 and the source 19, can be effected using two different methods. In the first method, the pulsed source 19 directs a reference light beam pulse 17 onto the electronic detector 3 during some image frames, referred to as first image frames, and not during other image frames, referred to as second image frames, and, to obtain said harmonization error electric signal $\epsilon$ without background or background noise, the difference between first and second image frames is obtained each time, for example in the system 21. According to the second method, the system 4 imposes a very short duration on the pulses of the reference light beam 17 and interleaves each pulse of said reference light beam between two image frames.

The parallel-sided plate 13, which is transparent to the light rays from the scene observed by the instrument 1, can be treated to increase its reflectivity for the reference light beam 17.

What is claimed is:

1. A method of detecting errors in harmonizing the optical axis (L—L) of an optical instrument (1) relative to a reference direction (V—V), characterized in that:

said reference direction (V—V) is materialized by a reference light beam (17); and said optical instrument (1) incorporates:

an optoelectronic detector (3) disposed in the focal plane (2) of said optical instrument (1);

an a focal optical system (6) coaxial with the optical axis (L—L) of said optical instrument (1) and which has a real entry pupil (7) and forms a real image (9) thereof; and an invariant optical axis translation system (10) disposed in the vicinity of said real image of the entry pupil (9), said invariant system (10) receiving said reference light beam (17) and, regardless of the angle of incidence of said beam, generating an exit light beam (18) which is parallel to said reference beam (17) and which is directed towards said optoelectronic detector (3) from at least approximately the center (9A) of said real image (9) of the entry pupil, said optoelectronic detector (3) delivering an electrical signal representative of the eccentricity of the light spot (v; 23) formed by said exit beam (18) in said focal plane (2) relative to the point (1) at which the optical axis (L—L) of said instrument (1) passes through said optical plane (2).

2. A method according to claim 1, characterized in that said electrical signal is used to correct said harmonization errors in the image (5) of the scene observed by said optical instrument (1) and formed by said optoelectronic detector (3).

3. A method according to claim 1 wherein the image of the scene observed by said optical instrument (1) and formed by said optoelectronic detector (3) takes the form of a succession of frames and characterized in that said reference light beam (17) is a pulsed beam, in that a reference beam (17) pulse is directed onto said optoelectronic detector (3) during some image frames, referred to as first image frames, and not during other image frames, referred to as second image frames, and in that, to obtain said electrical signal, the difference between a first frame and a second frame is obtained each time.

4. A method according to claim 1 wherein the image of the scene observed by said optical instrument (1) and formed by said optoelectronic detector (3) takes the form of a succession of frames and characterized in that said reference light beam (17) is pulsed, in that the duration of the pulses of said reference light beam (17) is very short compared to the duration of a said image frames and in that each pulse of said reference light beam (17) is interleaved between image frames.

5. A method according to claim 1, characterized in that the cross-section of said exit beam (18) is of the same order of magnitude as the area of the sensitive face of each of the individual photosensitive components (20) constituting said optoelectronic detector and in that said optoelectronic detector has the structure of a matrix (3.1) in which said photosensitive components (20) are disposed in rows and columns.

6. A method according to claim 1, characterized in that said reference beam (17) is a laser beam.

7. A method according claim 1, characterized in that the cross-section of said exit beam (18) is large compared to the area of the sensitive face of each of the individual photosensitive components (20) constituting said optoelectronic detector, in that said exit beam (18) forms the image of a test pattern (23) in said focal plane (2) and in that said optoelectronic detector includes at least one strip (22) of such photosensitive components (20).

8. A method according to claim 7, characterized in that said test pattern (23) has at least two rectilinear sections (24, 25) inclined relative to each other and relative to said strip (22).

9. A system for detecting errors in harmonizing the optical axis (L—L) of an optical instrument (1) with a reference direction (V—V), characterized in that it includes:

means (19) for generating a reference light beam (17) materializing said reference direction (V—V); and incorporated in said optical instrument (1):

an optoelectronic detector (3) disposed in the focal plane (2) of said optical instrument (1);

an a focal optical system (6) coaxial with the optical axis (L—L) of said optical instrument (1) and which has a real entry pupil (7) and forms a real image (9) thereof; and an invariant optical axis translation system (10) disposed in the vicinity of said real image of the entry pupil (9), said invariant system (10) receiving said reference light beam (17) and, regardless of the angle of incidence of said beam, generating an exit light beam (18) which is parallel to said reference beam (17) and which is directed towards said optoelectronic detector (3) from at least approximately the center (9A) of said real image (9) of the entry pupil.

10. A system according to claim 9, characterized in that said a focal optical system (6) has a magnification greater than 1.

11. A system according to claim 9, characterized in that said invariant system (10) includes three reflective surfaces (11, 12, 13) on the inside faces (14, 15, 16) of a rectangular trihedron forming a hollow cube corner, two of said reflective surfaces (11, 12) are disposed to receive said reference light beam (17) and the third of said reflective surfaces (13) is intersected by the optical axis (L—L) of said instrument (1) and is disposed to direct said exit light beam (18) onto said optoelectronic detector (3).

12. A system according to claim 11, characterized in that said third reflector surface (13) takes the form of a parallel-sided plate.

13. A system according to claim 12, characterized in that said parallel-sided plate (13) is treated to increase its reflectivity for said reference light beam (17).

14. A system according to claim 9, characterized in that said means (19) for generating said reference light beam are remote from said optical instrument.

15. A system according to claim 14, characterized in that the distance (d) between said optical instrument (1) and said means (19) for generating said reference light beam is several meters.

16. An optical instrument whose optical axis (L—L) must be harmonized with a reference direction (V—V), characterized in that it includes a system for detecting harmonization errors, said system including:

means (19) for generating a reference light beam (17) materializing said reference direction (V—V); and incorporated in said optical instrument (1):
- an optoelectronic detector (3) disposed in the focal plane (2) of said optical instrument (1);
- an a focal optical system (6) coaxial with the optical axis (L—L) of said optical instrument (1) and which has a real entry pupil (7) and forms a real image (9) thereof; and
- an invariant optical axis translation system (10) disposed in the vicinity of said real image of the entry pupil (9), said invariant system (10) receiving said reference light beam (17) and, regardless of the angle of incidence of said beam, generating an exit light beam (18) which is parallel to said reference beam (17) and which is directed towards said optoelectronic detector (3) from at least approximately the center (9A) of said real image (9) of the entry pupil.

* * * * *